July 23, 1935.  A. CASTELLANI  2,009,161
DEVICE COMBINED WITH A RANGEFINDER FOR FACILITATING
THE MEASUREMENT OF THE RANGES OF MOVING OBJECTIVES
Filed Dec. 31, 1932  2 Sheets-Sheet 2
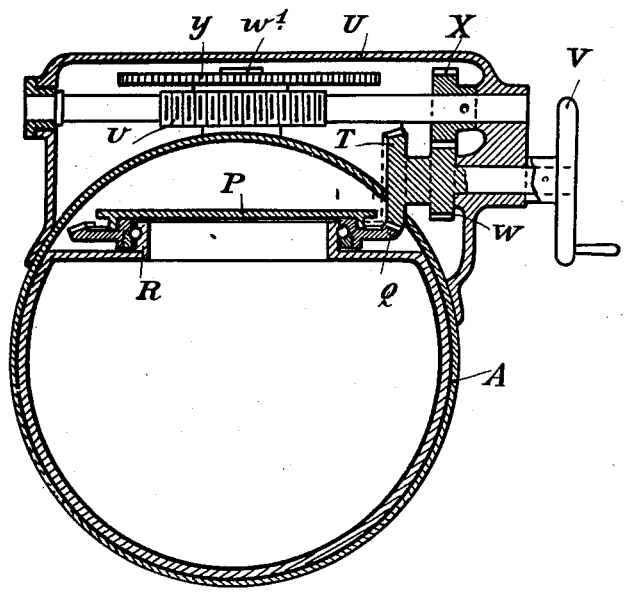
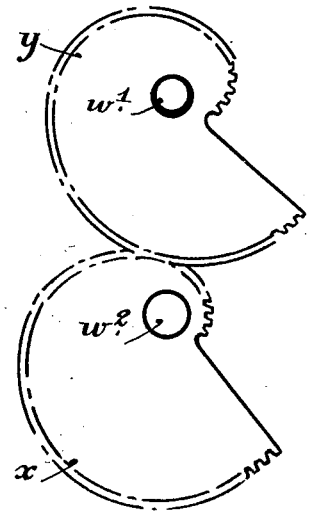
Inventor
Antoine Castellani
By Cameron, Kerkam + Sutton.
Attorneys.

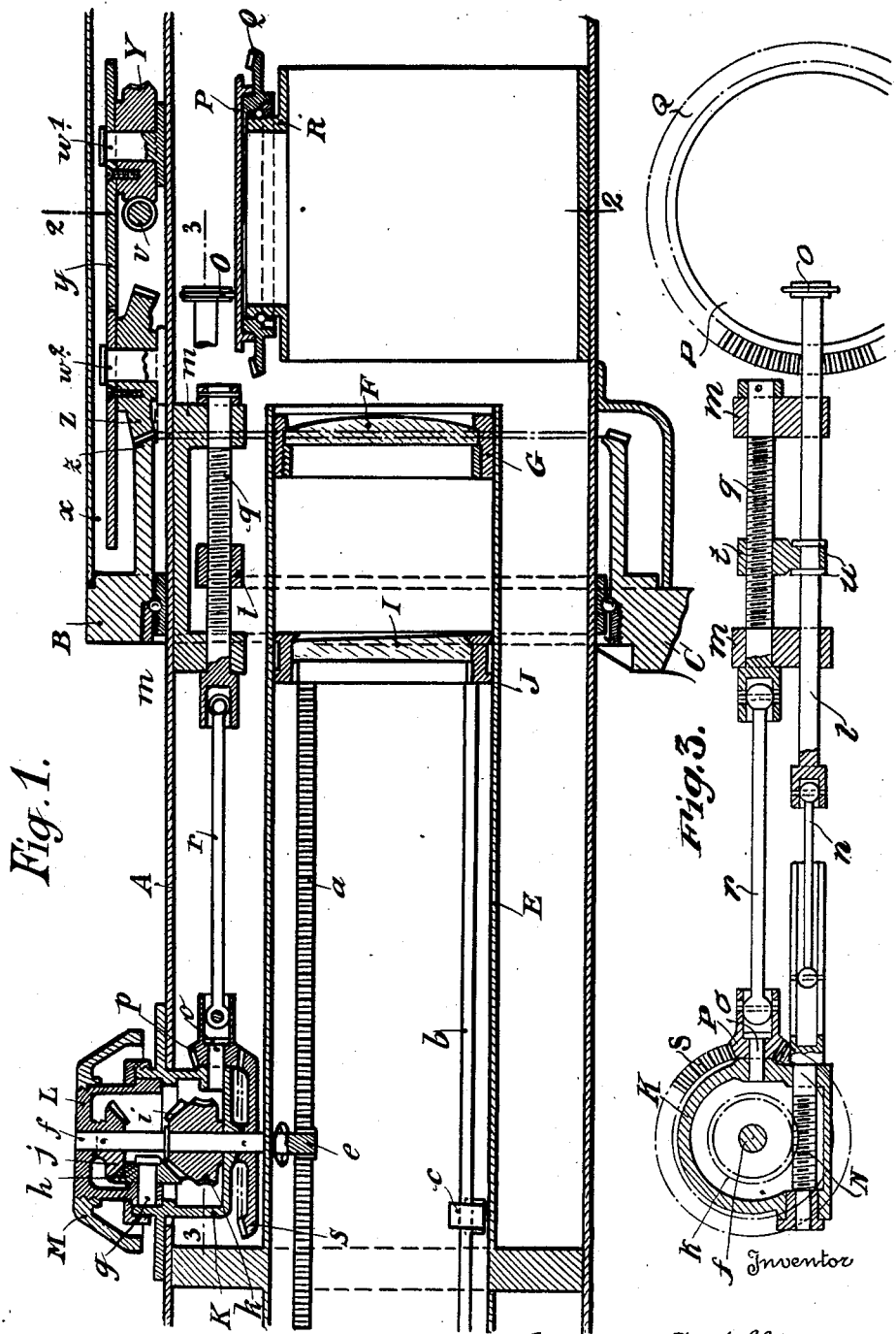

Patented July 23, 1935

2,009,161

UNITED STATES PATENT OFFICE 2,009,161

DEVICE COMBINED WITH A RANGEFINDER FOR FACILITATING THE MEASUREMENT OF THE RANGES OF MOVING OBJECTIVES

Antoine Castellani, Paris, France, assignor of one-half to Societe D'Optique et de Mecanique de Haute Precision, Paris, France, a limited joint-stock company of France Application December 31, 1932, Serial No. 649,714
In France January 14, 1932

10 Claims. (Cl. 88—2.2)

It is known that one of the difficulties in using an ordinary single-observer rangefinder for measuring the distance between the instrument and a moving objective, such as an aeroplane, resides in the fact that the range of the latter varies very rapidly. The result is that, while making series of measurements, the range taker, that is to say, the operator whose duty it is to determine the range or distance, is obliged to follow his target constantly in distance by turning the head which actuates the deflecting system. In order to obviate this disadvantage, there are devices in the form of certain types of altimeters, in which the rotation of the working head is not a function of the range or distance D but of the altitude H of the target. According to different methods, such devices combine the rotation of the said working head with the rotation of the rangefinder in its bearing rings, the latter rotation materializing the angle of elevation $s$ of the target, so that the deflecting system is brought automatically into the position for measuring the distance D which corresponds, on the one hand, to the altitude H determined by the rotation of the working head and, on the other, to the angle of elevation $s$ at which the rangefinder is sighted.

By utilizing a rangefinder provided with such a device for an objective such as an aeroplane flying at constant altitude, it is clear that the range taker, after having made a first measurement, has no longer any need to follow the areoplane, since the movement in elevation automatically brings the deflecting system into the correct position for measuring the distance. Even if the aeroplane is not flying at constant altitude, it does not generally depart very much from that condition. The task of the range taker is therefore considerably facilitated, due to the fact that he has only to follow the variations in altitude, which are almost always very slight in comparison with the variations in the distance.

However, the advantage thus provided by the devices referred to hereinbefore is only secured at the cost of the following disadvantages:

1. It is known that, in order to make an exact measurement, the range taker, after having brought the deflecting system into the vicinity of the correct position, turns the working head backwards and forwards so as to cause it to indicate distances which are alternately too long and too short relatively to the target, by an amount which is just perceptible to the eye, and then he stops the working head in the middle of its two last positions. At the point of view of the observation, these backward and forward movements correspond to definitive variation in the parallax of the target, that is to say, of the angle at which the base of the rangefinder is seen from the target, and which is proportional to $$\frac{1}{D}.$$

In the case of an ordinary rangefinder, in which the measuring head actuates directly a movable deflecting prism by $$\frac{1}{D},$$

the said backward and forward movements are therefore expressed by rotations of the working head of always the same amplitude. This is not the same with a device in which the working head rotates as a function of the altitude H. In this case, in fact, in order to obtain a definite variation in the quantity $$\frac{1}{D} = \frac{1}{H} \sin s,$$

the working head must be subjected to a much greater rotation in the case of small elevations than in the case of high elevations, and when the elevation becomes very small; the backward and forward movements assume such a magnitude that it becomes impossible to make exact measurements.

2. As a consequence of the preceding defect, the altimetric device must be adapted to be engaged or disengaged at will, so as to provide for the case in which it is desired to employ the instrument as an ordinary rangefinder on targets of very slight elevation. This is the case in particular for measurements on a levelling rod which are necessary for checking the adjustments. It has been shown, in fact, that at very slight elevations, the operation of the altitude head has hardly any appreciable effect on the deflecting system. Furthermore, disengagement must be automatic in certain types of altimeters, in which the lowermost limit of the measurable altitudes is lower than the lowermost limit of the distances, since the latter limit cannot fall below a certain value. In fact, when the altimeter indicates a very low altitude, it is necessary to prevent the aiming in elevation from tending to drive the deflecting system beyond its possible limit of travel at the risk of damaging the instrument, which would take place if the rangefinder was aimed towards the zenith. Disengagement does not offer any disadvantage, particularly if it is effected automatically, but engagement requires the elements constituting the connection between the altimeter and the deflecting system to be returned into correct relative position.

The object of the present invention is a new device based on a different principle. This new device likewise affords the advantage of not having to turn the working head until the aeroplane changes its altitude, while retaining the property that a given rotation of the said working head always produces on the deflecting system one and the same variation of the measured parallax and hence one and the same variation of the quantity $$\frac{1}{D}.$$

This device does not necessitate any operation of engagement or disengagement, because when aimed at a fixed target at any elevation, it functions exactly like an ordinary rangefinder.

Its conception is based on the theoretical considerations and the means set forth hereinafter:

In an ordinary rangefinder having a deflecting prism movable between one of the objectives and the corresponding image, the movement of the said deflecting prism being effected by means of a head, the rotation of which is proportional to the parallax measured and hence to $$\frac{1}{D},$$

there is inserted according to the invention, between the head and the deflecting prism, a differential gear which enables the sum of two movements to be transmitted to the said deflecting prism. The first of the said movements is produced by the rotation of the head, and the second of the said movements is effected by the rotation in elevation in such a manner, that if, on starting from a certain elevation $s$ for which the deflector occupies the position for measuring a distance $D$, the said elevation undergoes an elementary variation $ds$, the result is such a displacement of the deflector that its new position corresponds to the measurement of the distance at which would be situated a moving target that, starting from the distance $D$ and the elevation $s$, would pass to the elevation $s+ds$ without changing altitude.

The movement of the deflecting prism being proportional to $$\frac{1}{D} = \frac{1}{H} \sin s$$

the displacement which it must undergo when the angle of elevation varies by $ds$ without its altitude changing is proportional to:

$$d\left(\frac{1}{D}\right) = \frac{1}{H} d(\sin s)$$

Substituting $D \sin s$ for $H$ this expression may be written:

$$d\left(\frac{1}{D}\right) = \frac{1}{D} \sin s \times d(\sin s)$$

or:

$$d\left(\frac{1}{D}\right) = \frac{1}{D} \times d(L \sin s)$$

the symbol $L$, according to the classical notation, representing the Naperian logarithm.

With the exception of a factor of proportionality, this is differential law of the second movement to which the deflecting prism is subjected under the action of the elevation.

Under such conditions, when a first measurement of the range of an aeroplane flying at a constant altitude has been made, there is no longer any need to follow up the target by operating the working head, since the movement in elevation automatically brings the deflector into the correct measuring position. If the altitude varies, it is necessary in order, to make the measurement, again to turn the said head which transmits its movement directly to the deflecting prism without passing through the intermediary of the elevation. It follows that a given rotation always corresponds to one and the same variation in the parallax measured and, consequently, the backward and forward movements which the range taker has to make in order to make exact measurements retain the same amplitude irrespective of the elevation. More generally, when the rangefinder is constantly sighted on an aeroplane travelling over any path and the range taker operates the working head in such a way that the deflector always occupies the correct position for measuring the distance, the rotation of the said working head is not directly proportional to the variations in altitude of the aeroplane, but at each instant it is proportional to the difference between the variation in the parallax of the aeroplane and the variation to which the said parallax ought to be subjected if the altitude became constant at the instant in question.

The embodiment of a device based on the foregoing theory, calls for the construction of a movement which causes a displacement proportional to the quantity $$\frac{1}{D} d(L \sin s)$$

to correspond to an elementary variation $ds$ of the elevation. In the above differential expression, it ought to be possible to associate with every value of $s$ any value of $$\frac{1}{D}$$

which depends upon the unknown path over which the aeroplane will travel. It is therefore impossible to know a priori the integral which represents the law of the movement to be effected, and the problem can only be solved by the use of an integrator which constructs the said integral as a function of the displacement to which the deflecting prism will be subjected when the range taker makes the measurements of successive distances of the aeroplane.

A constructional form of the invention is shown by way of example in the accompanying drawings. Figure 1 is a longitudinal section, Figure 2 is a section along the line 2—2 in Figure 1, Figure 3 is a section along 3—3 in Figure 1 and Figure 4 is a plan view of a detail of the mechanism.

The rangefinder tube A (Figure 1) is rotatable in its bearing rings, of which one only B, is shown, the said rings being integral with the support C of the instrument. In the interior of the tube A is fixed the inner casing E in which are mounted the objectives, of which only one, F, is shown, the said objective being held in a mounting G fixed to one of the ends of the inner casing E. The measuring deflecting prism I is held in a member J which forms part of a carriage comprising a member similar to J, not shown, the said two members being connected together by a rack $a$ and two rods $b$, of which only one is shown in the drawings. The whole of the said carriage comprising the deflecting prism I is slidable without rotation in the inner casing E by virtue of the guide c which is integral with the said inner casing and is engaged by the bar b. The movement is transmitted to the rack a by means of a spur pinion e meshing therewith, which pinion e is fast with a spindle rotatable in a member K fixed on the rangefinder tube A. In the said member K, a member L fast with the measuring head M is adapted to rotate concentrically with the spindle f, the said member L carrying a spindle g which is perpendicular to the spindle f and around which a bevel pinion h is rotatable. At the same time, the member L acts as guide for the upper part of the spindle f, which is freely rotatable in the said member L. The bevel pinion h meshes with two other bevel pinions i and j mounted on the spindle f, the pinion i being loose on the said spindle and the pinion j being fast on the said spindle. The entire arrangement constituted by the measuring head M and the attached member L, the bevel pinions h, i and j and the spindles f and g form a differential gear for transmitting to the deflecting prism I, through the medium of the spur pinion e and the rack a, the resultant of two movements, one of which is produced by the rotation of the measuring head M and the other by the rotation of the bevel pinion i. The second of these movements is that which has to be controlled by the elevation.

For this purpose, the bevel pinion i is integral with a worm wheel k which is engaged by a worm N (Figure 3) freely rotatable without sliding in the member K. The rotation of the worm N is integral with the rotation of a rod l which is rotatably and slidably mounted in a support m fixed to the interior of the tube A. The connection between the worm N and the rod l is provided by a Cardan rod n having one end held in one of the ends of the rod l and the other end slidable in an extension of the worm N, the said extension having the form of a hollow cylinder split along two opposite generators for the passage of a small pin traversing the end ball of the Cardan rod n. At the other end of the rod l is a circular friction piece O, centered on and integral with the said rod, the said friction piece O bearing with its rough edge on a circular plate P. The plate P is disposed in such a manner that, when the rod l slides in the support m, the point of contact of the friction piece O moves along a diameter of the plate P. The plate P is rigidly secured to a wheel Q having bevel gearing and adapted to rotate on ball bearings round a support R (Figure 1) fixed to the interior of the tube A. The sliding of the rod l, which determines the position of the friction piece O on the plate P, is effected by the rotation of the spindle f in the following manner: The spindle f drives a bevel pinion S which is fast with it and which meshes with a bevel pinion p freely rotatable on a pin o fast with the member K, the said pin being parallel to the rod l. The said pinion p effects the rotation of a screwthreaded spindle q situated in line with the axis of the said pinion, the said screwthreaded spindle q being rotatable without sliding in the same support m as the rod l. The connection between the screwthreaded spindle q and the pinion p is effected by means of a Cardan rod r. A nut t through which passes the rod l and held between two collars u (Figure 3) on the said rod is mounted on the screwthreaded spindle q. The nut t is thus not rotatable and its only possible movement, when the screwthreaded spindle q rotates is a displacement along the latter, which displacement moves the rod l and the friction piece O.

The wheel Q, fast with the plate P, meshes with a bevel pinion T (Figure 2) which is rotatable in a casing U fixed on the tube A. The rotation of the pinion T is effected by means of the elevation handwheel V which is fast therewith. A spur pinion W integral with the bevel pinion T meshes with a second spur pinion X fast with worm v rotatable without sliding in the casing U. The said worm v is engaged by a wormwheel Y (Figure 1) idle on a pivot $w^1$ fixed on the tube A. By the side of the said wheel Y, there is idly mounted on a pivot $w^2$, likewise fixed on the tube A and parallel to the pivot $w^1$, a bevel pinion Z meshing with a bevel toothed ring z carried by the bearing collar B. The rotation of the pinion Z is connected to the rotation of the wheel Y by means of a spiral gear formed by the parts x and y, fixed respectively to the pinion Z and the wheel Y and shown in plan in Figure 4. On turning the handwheel V, the pinion Z is caused to rotate through the medium of the spur pinions W and X, the worm v, the wheel Y and the teeth carried by the parts x and y. Thus, the said pinion Z rolls on the teeth z carried by the ring B, thus effecting the rotation in elevation of the rangefinder. The shape of the parts x and y is so designed that, in order to make the rangefinder follow the variation of the elevation s, the rotation to which the handwheel V has to be subjected is proportional to the variation of the logarithm of sin s. (However, in the regions in the vicinity of the elevations 0° and 90°, this law is distorted, in order that the rotation of the handwheel V will enable the rangefinder to be sighted at such elevations.)

Since the handwheel V at the same time effects the rotation of the plate P through the medium of the bevel wheel T and the wheel Q, it will be appreciated that, to a variation ds of the elevation, there will correspond a rotation of the plate P proportional to $d(\text{L} \sin s)$ which expresses the variation of the logarithm of sine s produced by the variation ds of the elevation. Moreover, as mentioned hereinbefore, the position of the friction piece O on the plate P is determined by the rotation of the spindle f and consequently only depends upon the position of measuring deflecting prism I. Adjustment is so effected that, when the deflecting prism is in the position for measuring infinite distance, the friction piece O is in contact with the plate P in the centre of the said plate, that is to say, on the axis of rotation of P. When the deflecting prism moves from the aforesaid position to take up a position for measuring a distance D, it is subjected to a displacement proportional to $$\frac{1}{D}$$

and the same applies to the friction piece O, which is therefore always at a distance from the centre of the plate P proportional to $$\frac{1}{D}$$

if D denotes the distance corresponding to the position occupied by the deflecting prism I. The rotation of the friction piece O is obviously proportional, at each instant, on the one hand to the rotation of the plate P, and on the other to the distance of the friction piece O from the centre of the plate P. Hence, for an elementary variation $ds$ of the elevation $s$, this rotation is proportional to the product $$\frac{1}{D}d(L \sin s)$$

in accordance with the theory set forth hereinbefore. This rotation causes the deflecting prism I to move by a proportional amount through the medium of the rod $l$, the Cardan rod $n$, the worm N, the wheel $k$, the bevel pinions $i$, $h$ and $j$, the spindle $f$, the pinion $e$ and the rack $a$.

The reading of the distance, not shown on the drawings, may be effected, as in many known rangefinders, by means of a rectilinear scale, fast with the deflecting prism I, the said scale moving in front of a fixed mark. In addition, in order to permit the reading of the altitude, which it is of interest to know, the whole of the mechanism may be completed by a known device such as, for example, that indicated in the Patent No. 1,725,617, granted 20th August 1929.

Of course, the invention is not limited to the particular device which is described in the foregoing and which may form the subject of numerous modifications. For example, it is possible to select a different type of measuring deflecting system, provided the said system is adapted to be actuated by a movement proportional to $$\frac{1}{D}$$

Furthermore, the rotation in elevation of the rangefinder may be effected by means of a handwheel turning proportionally to the elevation and causing the rotation of the plate P proportionally to the logarithm of sine $s$ through the medium of a mechanism comprising either a spiral gearing, such as that described, or a cam.

I claim:—

1. In a rangefinder of the type having a fixed base and a deflecting system displaceable in amounts inversely proportional to the measured distance, a working head, means operatively connecting said head to the deflecting system and so constructed and arranged that with any constant angle of elevation of the line of sight of the rangefinder a given movement of said head always produces a displacement of said deflecting system proportional to the same variation in the reciprocal of the measured distance, means for varying the angle of elevation of the line of sight of the rangefinder, and means operatively associated with both said last named means for displacing the deflecting system from any given position by amounts dependent both upon said position and upon the changes in the angle of elevation of the line of sight.

2. In a rangefinder of the type having a fixed base and a deflecting system displaceable in amounts inversely proportional to the measured distance, a working head, means operatively connecting said head to the deflecting system and so constructed and arranged that with any constant angle of elevation of the line of sight of the rangefinder a given movement of said head always produces a displacement of said deflecting system proportional to the same variation in the reciprocal of the measured distance, means for varying the angle of elevation of the line of sight of the rangefinder, and means operatively associated with both said last named means and effective upon a change in the angle of elevation of the line of sight for displacing the deflecting system from any given position by an amount proportional to the change in the reciprocal of the range of an object moving at a fixed height from the position determined by the initial range corresponding to the given position of said deflecting system and the initial angle of elevation of the line of sight to the position determined by the changed angle of elevation of the line of sight.

3. In a rangefinder of the type having a fixed base and a deflecting system displaceable in amounts inversely proportional to the measured distance, a working head, means operatively connecting said head to the deflecting system and so constructed and arranged that with any constant angle of elevation of the line of sight of the rangefinder a given movement of said head always produces a displacement of said deflecting system proportional to the same variation in the reciprocal of the measured distance, means for varying the angle of elevation of the line of sight of the rangefinder, and means operatively associated with both said last named means and effective upon an elementary change $ds$ in the angle of elevation of the line of sight for displacing the deflecting system from any given position by an amount proportional to the product of the reciprocal of the distance corresponding to the said position of the deflecting system and the variation in the Naperian logarithm of the sine of the angle of elevation of the line of sight produced by movement of said elevation varying means.

4. In a rangefinder of the type having a fixed base and a deflecting system displaceable in amounts inversely proportional to the measured distance, a working head, a differential gear unit operatively connecting said head to the deflecting system and so constructed and arranged that with any constant angle of elevation of the line of sight of the rangefinder a goven movement of said head always produces a displacement of said deflecting system proportional to the same variation in the reciprocal of the measured distance, means for varying the angle of elevation of the line of sight of the rangefinder, and means including an integrating mechanism operatively connecting said last named means and said differential gear unit and effective upon operation of said elevation varying means for displacing the deflecting system from any given position by amounts dependent both upon said position and upon the changes in the angle of elevation of the line of sight.

5. In a rangefinder of the type having a fixed base and a deflecting system displaceable in amounts inversely proportional to the measured distance, a working head, a differential gear unit operatively connecting said head to the deflecting system and adapted to displace the latter proportionally to movements of said head, means for varying the angle of elevation of the line of sight of the rangefinder, and means including an integrating mechanism operatively connecting said last named means and said differential gear unit and effective upon an elementary change $ds$ in the angle of elevation of the line of sight for displacing the deflecting system from any given position by an amount proportional to the product of the reciprocal of the distance corresponding to said position and the variation in the Naperian logarithm of the sine of the angle of elevation of the line of sight produced by movement of said elevation varying means.

6. In a rangefinder of the type having a fixed base and a deflecting system displaceable in amounts inversely proportional to the measured distance, a working head, a differential gear unit operatively connecting said head to the deflecting system and adapted to displace the latter proportionally to movements of said head, means for varying the angle of elevation of the line of sight of the rangefinder, and means including an integrating mechanism operatively connecting said last named means and said differential gear unit and effective upon an elementary change $ds$ in the angle of elevation of the line of sight for displacing the deflecting system from any given position by an amount proportional to the product of the reciprocal of the distance corresponding to said position of the deflecting system and the variation in the Naperian logarithm of the sine of the angle of elevation of the line of sight produced by movement of said elevation varying means, one element of said integrating mechanism being actuated by the movements of said deflecting system and another by said elevation varying means.

7. In a rangefinder of the type having a fixed base and a deflecting system displaceable in amounts inversely proportional to the measured distance, a working head, a differential gear unit operatively connecting said head to the deflecting system and adapted to displace the latter proportionally to movements of said head, an elevating and depressing mechanism for varying the angle of elevation of the line of sight of the rangefinder, and means including an integrating mechanism operatively connecting said last named mechanism and said differential gear unit and effective upon an elementary change $ds$ in the angle of elevation of the line of sight for displacing the deflecting system from any given position by an amount proportional to the product of the reciprocal of the distance corresponding to said position and the variation in the Naperian logarithm of the angle of elevation of the line of sight produced by movement of said elevating and depressing mechanism, one element of said integrating mechanism being actuated by and in proportion to the movements of said deflecting system and another being operatively connected with said elevating and depressing mechanism and movable in proportion to the variation in the Naperian logarithm of the sine of the angle of elevation of the line of sight.

8. In a rangefinder of the type having a fixed base and a deflecting system displaceable in amounts inversely proportional to the measured distance, a working head, means operatively connecting said head and the deflecting system and adapted to displace the latter proportionally to movements of said head, means for varying the angle of elevation of the line of sight of the rangefinder, and means operatively associated with both said last named means for displacing the deflecting system from any given position in accordance with changes in the angle of elevation of the line of sight, including a rotatable plate, means actuated by said elevation varying means for rotating said plate proportionally to the variation in the Naperian logarithm of the sine of the angle of elevation of the line of sight, a rotatable element in frictional engagement with the surface of said plate, means for converting the rotation of said element into displacement of the deflecting system, and means actuated by movement of said deflecting system for varying the distance from the point of contact of said rotatable element with said plate to the axis of rotation of the plate proportionally to the reciprocal of the distance which is measured by the position of said deflecting system.

9. In a rangefinder of the type having a fixed base and a deflecting system displaceable in amounts inversely proportional to the measured distance, a working head, a differential gear unit operatively connecting said head and the deflecting system and adapted to displace the latter proportionally to movements of said head, means for varying the angle of elevation of the line of sight of the rangefinder, and means including an integrating system operatively associated with both said last named means and said differential gear unit for displacing the deflecting system from any given position in accordance with said position and with changes in the angle of elevation of the line of sight, said integrating system comprising a rotatable plate, means actuated by said elevation varying means for rotating said plate proportionally to the variation in the Naperian logarithm of the sine of the angle of elevation of the line of sight, a rotatable element in frictional engagement with the surface of said plate, means for transmitting the rotation of said element to said differential gear unit and thereby effecting displacement of the deflecting system, and means actuated by movement of said deflecting system for varying the distance from the point of contact of said rotatable element with said plate to the axis of rotation of the plate proportionally to the reciprocal of the distance which is measured by the position of said deflecting system.

10. In a rangefinder of the type having a fixed base and a deflecting system displaceable in amounts inversely proportional to the measured distance, a working head, a differential gear unit operatively connecting said head and the deflecting system and adapted to displace the latter proportionally to movements of said head, means for varying the angle of elevation of the line of sight of the rangefinder, and means including an integrating system operatively associated with both said last named means and said differential gear unit for displacing the deflecting system from any given position in accordance with said position and with changes in the angle of elevation of the line of sight, said integrating system comprising a rotatable plate, means actuated by said elevation varying means for rotating said plate proportionally to the variation in the Naperian logarithm of the sine of the angle of elevation of the line of sight, a rotatable element in frictional engagement with the surface of said plate, the axes of rotation of said rotatable element and said plate being substantially perpendicular, means for transmitting the rotation of said rotatable element to said differential gear unit and thereby effecting displacement of the deflecting system, and means actuated by movement of said deflecting system for moving said rotatable element along its axis of rotation so as to vary the distance from the point of contact of said element with said plate to the axis of rotation of the plate proportionally to the reciprocal of the distance which is measured by the position of said deflecting system.

ANTOINE CASTELLANI.